April 18, 1950     D. ROSENHEIM     2,504,157
MOLDED PLASTIC SUNGLASSES AND THE LIKE
Filed Sept. 23, 1943
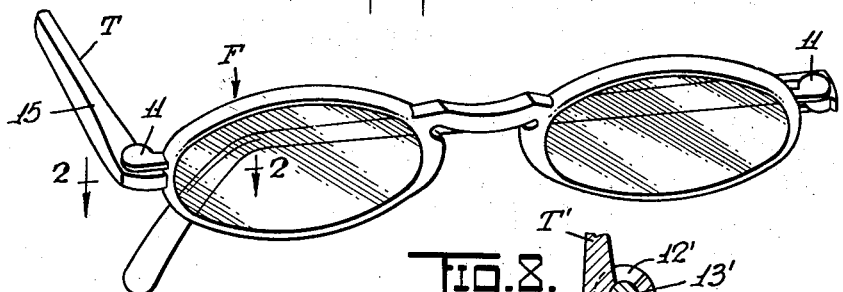
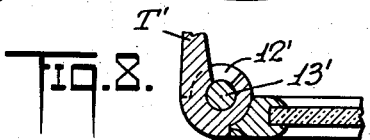
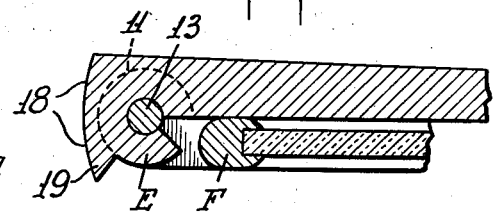
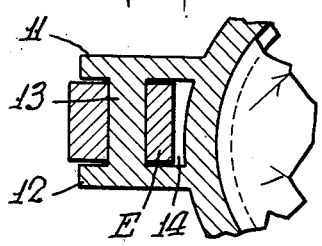
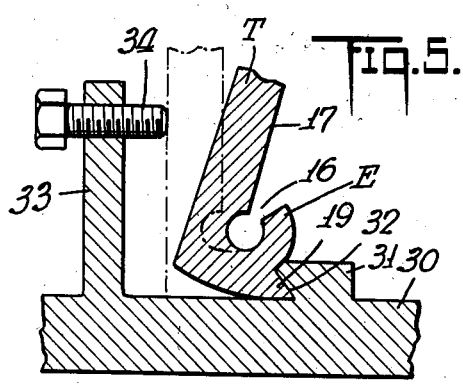
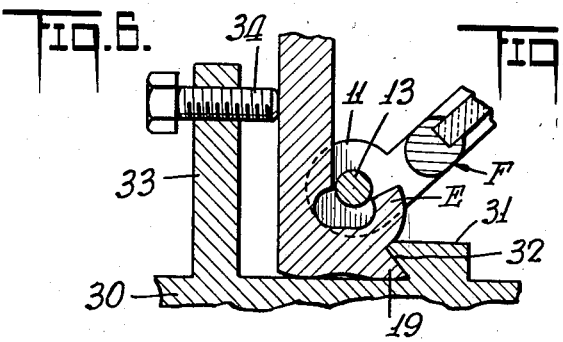
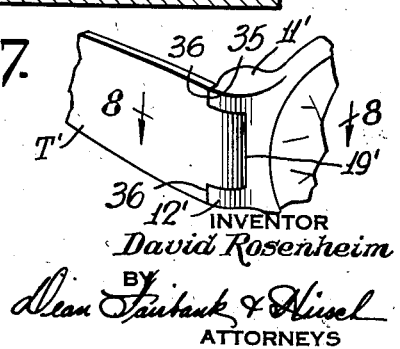
INVENTOR
*David Rosenheim*
BY
*Dean Fairbank & Hirsch*
ATTORNEYS Patented Apr. 18, 1950

2,504,157

UNITED STATES PATENT OFFICE 2,504,157

MOLDED PLASTIC SUNGLASSES AND THE LIKE

David Rosenheim, New York, N. Y., assignor to Lapin Products, Inc., Newark, N. J., a corporation of New York Application September 23, 1943, Serial No. 503,489

18 Claims. (Cl. 88—53)

While the present invention finds an important application in the hinge structure of thermoplastic resin spectacle frames, it has other applications to hinged structures for a variety of other uses.

It is among the objects of the invention to provide a hinge assembly of the above type which in the spectacle frame embodiment involves the use of only two dies, that for the frame and that for the temples, the hinging structure being formed of integral unitary parts of the frame and temple, and dispensing with the need for a separate hinging pin or screw and with the cost of fabricating and applying such connector in the course of assembly.

Another object is to provide a spectacle frame of the above type of reduced manufacturing cost but of enhanced security and durability as well as of improved appearance.

Another object is to provide a convenient and expeditious method and a simple jig therefor, for assembly of the temples to the spectacle frames, without the need for screws, bolts, rivets or any threading or heading operations, but with enhanced security nevertheless.

In the accompanying drawings in which are shown one or more of various possible embodiments of the several features of the invention:

Fig. 1 is a perspective view of spectacles incorporating the hinge structure, shown open at one temple and in closed position at the other, Fig. 2 is a transverse sectional view on a larger scale taken on line 2—2 of Fig. 1, Fig. 3 is a view similar to Fig. 2 showing the temple lying against the frame, Fig. 4 is a transverse sectional view taken on line 4—4 of Fig. 2, Fig. 5 is a transverse sectional view showing the assembly jig and the application of the temple thereto preparatory to assembly, Fig. 6 is a view similar to Fig. 5 showing the assembling operation, Fig. 7 is a perspective view of a fragment of spectacles of the side shield temple type, and Fig. 8 is a sectional detail taken on line 8—8 of Fig. 7.

Referring now to the drawings, the spectacles illustratively shown are generally conventional insofar as they include a frame F of thermoplastic resin and temples or side pieces T hinged thereto.

According to the invention, the frame has a pair of parallel ears or plate members 11 and 12 at each end thereof which are connected by a preferably cylindrical bearing pin 13 spaced from the frame by a gap 14. The ears, if desired, may be of thickness less than that of the frame, as shown, their width being at right angles to the frame. Desirably, the length of the ears extends not in the plane of the frame but at an obtuse angle slightly rearward therefrom, as appears best in Fig. 2, the axis of the bearing pin 13 being located not in the median plane of the frame but rearward thereof and desirably substantially in the plane of the rear face of the frame, as best shown in Fig. 2.

The frame with its ears and bearing pin is (as may readily be accomplished) molded in conventional injection molding apparatus as a single unitary piece.

The temple piece, the length of which is conventional, has an eye or split block E at the hinge end thereof, of thickness but slightly less than that of the maximum width 15 near the root of the temple. The eye is laterally cleft as at 16 adjacent the root end of the temple shank 17. That cleft is of width materially less than the diameter of the bearing pin 13.

The end edge of the temple is desirably somewhat rounded at 18 and at the end thereof nearest the frame in the open position shown in Fig. 2 has a stop lug extension or expander lip 19 which abuts the frame at 20 to limit the outward hinging movement of the temple when in position of wear.

The temple is likewise preferably of thermoplastic resin such as the cellulose acetate plastic commonly used for spectacle frames and the like, and which has some resilience. For assembly of the temple to the frame, the eye E may readily be spread for its cleft 16 to open sufficiently to permit the frame to be assembled thereto by introducing the bearing pin 13 through the open cleft 16 and then allowing the eye to return to its initial form as shown in Fig. 2.

A simple jig for convenience of assembly by such method is shown in Figs. 5 and 6. The jig comprises a base 30 having a lug 31 on its top undercut at 32 to anchor the stop lug 19 of the temple piece. The upright 33 rising from the base has an adjustable stop screw 34 therethrough to limit the angle of displacement of the temple shank 17 whose eye has been hooked, or anchored as shown and set forth. The stop screw 34 is adjusted to such position that when the shank of the temple is brought into engagement therewith, the cleft 16 has been spread sufficiently to permit the operator to introduce the bearing pin 13 of the frame structure F between the ears 11 and 12 into the eye E of the temple as best shown in Fig. 6. Upon release of the assembly from the jig, the temple by virtue of its resilience returns to its original shape as best shown in Fig. 2 to embrace or encompass the bearing pin 13. The assembly thus has an integral and fixed bearing pin 13 of substantial diameter which affords adequate bearing surface for the eye of the temple, and that eye is moreover held against longitudinal movement by the fixed integral ears 11 and 12, which are desirably of area sufficient completely to overlap the ends of the eye. The bearing structure is, therefore, secure and not subject to looseness nor is the temple apt to come off since the bearing pin 13 is materially larger than the cleft 16 through which the assembly was effected.

The embodiment of Figs. 7 and 8 showing the application of the invention to spectacles with shield temples T' is generally similar to that of Figs. 1 to 4. The ears 11' and 12' are spaced by a considerably greater gap than in the case of the other embodiment and are desirably of greater thickness and the bearing pin 13' extending therebetween, is of correspondingly greater length. They also are formed each with an integral stop tooth 35 across the thickness thereof to serve as abutment stops for the outer parts 36 of the end edge of the shield temple T'. The eye on the shield temple is generally similar to that of Figs. 1 to 4 except that it is of considerably greater length extending across the entire gap between the ears 11' and 12' and being of length equal to that of the bearing pin 13' which it encompasses. The eye has a correspondingly elongated stop lug 19' which in the open position of the temple abuts the frame edge intervening between the ears.

It is understood that as in the embodiment of Figs. 1 to 4, the frame with its ears and connecting bearing pin is molded as a unitary piece as is the side temple with its cleft hinging eye.

As many changes could be made in the above article and many embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Molded plastic spectacles comprising a molded plastic one piece frame having at each side thereof a pair of outwardly projecting horizontal parallel flat ears positioned in planes at right angles to the plane of the frame and a vertical transverse plastic bearing pin extending between said ears and molded integrally therewith and serving as the sole connection between said ears apart from said frame and a plastic structure hinged thereon having a cleft eye encompassing and resiliently embracing at least about 270° of the circumference of said bearing pin, the cleft being of width less than the diameter of said bearing pin, and a stop upon said eye serving to limit the hinging movement, said eye constituting an enlarged block of plastic of such thickness as to substantially fill the space between said ears but at the same time so that it may readily be inserted between said ears for assembly to said pin, said eye having a substantially greater thickness opposite said cleft than adjacent said cleft so as to reinforce and give it greater strength opposite said cleft.

2. Spectacles comprising a frame having parallel lateral ears protruding from the end thereof, a cylindrical bearing pin connecting said ears at a distance from said frame, the frame, ears and hinge bearing pin comprising a unitary thermo-plastic molded structure, a temple having a hinging eye between said ears and encompassing said bearing pin, said eye being of somewhat resilient thermo-plastic material and presenting a lateral cleft of width smaller than the diameter of the bearing pin, said eye having a lateral extension lug abutting the frame and limiting the hinging movement of the temple away from the frame, said eye constituting an enlarged block of plastic of such thickness as to substantially fill the space between said ears but at the same time so that it may readily be inserted between said ears for assembly to said pin, said eye having a substantially greater thickness opposite said cleft than adjacent said cleft so as to reinforce and give it greater strength opposite said cleft.

3. Spectacles comprising a frame having a pair of relatively flat ears at right angles to the plane of the frame and directed slightly rearward therefrom, a cylindrical bearing pin connecting said ears, spaced from said frame and having an axis substantially in the plane of the rear face of the frame, said frame, ears and bearing pin being an integral unitary thermo-plastic resin structure, a temple of slightly resilient thermoplastic resin, said temple having a cleft eye extending between said ears and encompassing said bearing pin, the cleft of the eye being adjacent the length of the temple and of width less than the diameter of the bearing pin, one side of said cleft being aligned with the inner side of said temple, said eye having unitary therewith an outwardly projecting stop lug coacting with the frame and limiting the outward hinging movement of the temple when in position for wear.

4. Shield temple spectacles comprising a frame structure, a pair of ears having a connecting bearing pin spaced from the frame structure, the frame, ears and pin constituting a unitary thermo-plastic molded piece, a relatively wide shield temple piece of somewhat resilient thermoplastic resin having an eye between said ears and encompassing said bearing pin, said eye being of length substantially equal to the distance between the ears, said eye having a lateral cleft along its length of width less than the diameter of the bearing pin, said eye having a lug along the length thereof abutting the adjacent part of the frame when in position of use, said shield temple having lateral end portions which flank the hinging eye, said ears having unitary stop lugs for arresting the lateral end portions of the shield temple that flank the hinging eye.

5. A pair of glasses comprising an integral thermoplastic frame having vertical lens receiving portions and a nose support member connecting said lens receiving portions, each of said lens receiving portions having a pair of outwardly projecting, integral, parallel, separated, horizontal, free ears, each pair being provided with a vertical connecting pivot pin molded integrally with said ears and thermoplastic temple members having integral cleft expandable eye portions engaged around the periphery of said pivot pins and substantially completely surrounding and grasping the periphery of said pins, the clefts of said eye portions extending rearwardly and having an opening substantially less than the diameter of said pivot pins, each said eye portion being substantially thicker opposite the cleft so as to reinforce the eye portion and enable separation of the cleft without breakage upon insertion of said pivotal pin.

6. A pair of glasses comprising an integral thermoplastic frame having lens receiving portions and a nose support member connecting said lens receiving portions, each of said lens receiving portions having outwardly projecting, integral, parallel, separated, horizontal, free ears with a vertical connecting pivot pin molded integrally with said ears and a thermoplastic temple member having an integral cleft expanding eye portion engaged around the periphery of said pivot pin and partially surrounding said pin, said eye portion having a vertical thickness less than the spacing between the inside faces of said ears and a peripheral horizontal annular thickness greater than said pin, the clefts of said eye portions extending rearwardly and having an opening substantially less than the diameter of said pivot pins, each said eye portion being substantially thicker opposite the cleft so as to reinforce the eye portion and enable separation of the cleft without breakage upon insertion of said pivotal pin.

7. A pair of glasses comprising an integral thermoplastic frame having lens receiving portions and a nose support member connecting said lens receiving portions, each of said lens receiving portions having a pair of outwardly projecting, integral, parallel, separated, horizontal ears with free unconnected edges and with a vertical connecting pivot pin molded integrally with and extending between the middle portions of said ears and thermoplastic temple members having an integral cleft expandable eye portion engaged around the periphery of said pivot pin and partially surrounding said pin, the pairs of said ears being unconnected except by said lens receiving portions and said pivot pins, the clefts of said eye portions extending rearwardly and having an opening substantially less than the diameter of said pivot pins, each said eye portion being substantially thicker opposite the cleft so as to reinforce the eye portion and enable separation of the cleft without breakage upon insertion of said pivotal pin.

8. In a pair of five-piece sun glasses comprising two glass lenses and a single one piece molded thermoplastic frame and two one-piece temple members, hinge connections between the temple members and a frame comprising integral free parallel spaced ears projecting horizontally outwardly from the sides of said frame, and pivot pins extending vertically between said ears and integral therewith, serving as the sole means of connecting said ears beyond said frame, and said temple members having cleft eye portions engaging said pins of such vertical thickness throughout as to be capable of being inserted between said ears, and of such stretchability as to be opened at said clefts and horizontally passed onto said pins with the eye portions snapping back and embracing said pins, said eye portions being formed integrally with said temple members, the clefts of said eye portions extending rearwardly and having an opening substantially less than the diameter of said pivot pins, each said eye portion being substantially thicker opposite the cleft so as to reinforce the eye portion and enable separation of the cleft without breakage upon insertion of said pivotal pin.

9. In a pair of glasses, a lens receiving eye portion having outwardly projecting parallel flat ears with an integral connecting pivot pin and one-piece thermoplastic temple member having a temple bar and a cleft pivotal eye portion at the end of said bar engaging said pivot pin, said cleft being positioned along the inside face of said temple bar, said eye portion forming a relatively thin, readily bendable neck at the end of said temple bar enabling said eye to be readily opened slightly at said cleft to receive said pivot pin, said eye portion being provided with a stop lip extending outwardly from the outer periphery of said eye portion to limit opening movement of said temple member when assembled in said glasses and to serve to enable said eye to be opened slightly to receive said pivot pin, said cleft eye portions substantially filling the entire space between said ears and having a greater thickness opposite said clefts.

10. In a pair of glasses, a lens receiving eye portion having outwardly projecting parallel flat ears with an integral connecting pivot pin and a one-piece thermoplastic temple member having a temple bar and a cleft pivotal eye portion at the end of said bar engaging said pivot pin, said cleft being positioned along the inside face of said temple bar, and said eye portion being provided on its exterior, at a point substantially removed from said cleft with a stop and expander lip extending outwardly from the outer periphery of said eye portion, said cleft eye portions substantially filling the entire space between said ears and having a greater thickness opposite said clefts.

11. Spectacles comprising a frame having a pair of relatively flat ears at right angles to the plane of the frame, a cylindrical bearing pin connecting said ears, spaced from said frame and having an axis substantially in the plane of one face of the frame, said frame, ears and bearing pin being an integral unitary thermo-plastic resin structure, a temple of slightly resilient thermo-plastic resin, said temple having a cleft eye extending between said ears and encompassing said bearing pin, the cleft of the eye being adjacent the length of the temple and of width less than the diameter of the bearing pin, each said eye portion being substantially thicker opposite the cleft so as to reinforce the eye portion and enable separation of the cleft without breakage upon insertion of said pivotal pin.

12. A molded plastic sunglass construction comprising a rounded lens-receiving rim member positioned in a vertical plane having a closely spaced pair of short horizontal plate members with a connecting vertical cylindrical pivot pin, said plate members lying in a plane transverse to the plane of the rim member and extending outwardly and rearwardly from said rim member, said plate members and said pin being molded integrally with said rim member, a temple member having an integrally molded eye enlargement block substantially filling the space between said plate members and having a thickness substantially equal to the space between the plate members and having an off-center vertical circular opening about the same diameter as said pin and in which opening said pin closely fits and having a vertical sector wedge-like opening extending along said temple member into said vertical opening, said wedge opening at the circular opening having substantially smaller width than the diameter of said pin and at the outer edge of said block having a larger width to receive said pin when said pin is to be inserted into said opening said block having greater lateral thickness on the side opposite the wedge-like opening so as to reinforce the block and enable separation of the wedge-like opening without breakage upon insertion of said pin.

13. The construction of claim 12 in which the block has an expander lip for contacting the front of the rim member and acting as a stop to limit outward movement of the temple member and also acting to enable expansion of said wedge-like opening to permit insertion of said pin.

14. In a plastic hinging construction useful in connecting temples to eye glass frames where an element having a male hinging member is to be connected to an integrally molded thermoplastic element having a female hinging member, said male hinging member having a cylindrical post to be snapped into and turned within said female hinging member, said female hinging member having a bearing block with a cylindrical recess to fit around said post and encompass and grasp said post and said block being provided with a cleft converging toward and extending into said recess, the outer end of said cleft having a greater width than said post and the inner end of said cleft having a substantially narrower width than said post so that said post may be readily inserted into the outer end of said cleft, but must be forced past the inner end of said cleft into said recess and the thickness of the block at the side of the recess opposite the cleft being substantially greater than the thickness of the block on each side of said cleft so as to reinforce the block and enable separation of the cleft without breakage upon insertion of said post.

15. The hinging construction of claim 14 in which said male hinging member consists of two parallel plate-like flat elements extending outwardly from said first-mentioned element and said post extending between and serving as the sole means of connection between said plate-like flat elements, said post and said plate-like flat elements being integrally molded together.

16. The hinging construction of claim 14 in which said recess has the same length as said post and said thermoplastic element has wings extending beyond and on each side of the ends of said post.

17. The hinging construction of claim 14 in which said thermoplastic element has stop means to limit its motion in one direction by contacting said first-mentioned element.

18. The hinging construction of claim 14 in which said thermoplastic element is provided with means to enable separation of said cleft for more ready insertion of said post.

DAVID ROSENHEIM.

REFERENCES CITED

The following references are of record in the file of this patent:

UNITED STATES PATENTS

| Number | Name | Date |
|---|---|---|
| 41,610 | Durning | Feb. 16, 1864 |
| 368,852 | Ramsay | Aug. 23, 1887 |
| 693,546 | Johnson | Feb. 18, 1902 |
| 1,301,461 | Ledward | Apr. 22, 1919 |
| 1,444,124 | Jaffe et al. | Feb. 6, 1923 |
| 1,526,211 | Hirschman | Feb. 10, 1925 |
| 1,537,562 | Stock | May 12, 1925 |
| 1,955,690 | Spill | Apr. 17, 1934 |
| 2,200,399 | Primas | May 14, 1940 |
| 2,210,360 | Caldwell | Aug. 6, 1940 |
| 2,305,562 | Thompson et al. | Dec. 15, 1942 |
| 2,321,118 | Zechiel | June 8, 1943 |
| 2,389,023 | Brown | Nov. 13, 1945 |